(12) United States Patent
Naruse

(10) Patent No.: US 8,135,720 B2
(45) Date of Patent: Mar. 13, 2012

(54) HOMOLOGY SEARCHING METHOD

(75) Inventor: Akira Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 12/610,631

(22) Filed: Nov. 2, 2009

(65) Prior Publication Data

US 2010/0145983 A1  Jun. 10, 2010

(30) Foreign Application Priority Data

Dec. 4, 2008 (JP) ................................. 2008-309941

(51) Int. Cl.
*G06F 7/00* (2006.01)
*G06F 17/30* (2006.01)
(52) U.S. Cl. ....................................... 707/750; 707/769
(58) Field of Classification Search .................. None
See application file for complete search history.

(56) References Cited

FOREIGN PATENT DOCUMENTS

| JP | 9-50438 | 2/1997 |
|---|---|---|
| JP | 2005-84973 | 3/2005 |
| WO | WO 02/090978 | 11/2002 |

*Primary Examiner* — Charles Rones
*Assistant Examiner* — Harold Hotelling
(74) *Attorney, Agent, or Firm* — Staas & Halsey LLP

(57) ABSTRACT

An apparatus for controlling devices for searching homology of queries in a base sequence in parallel, includes: a memory for storing a base sequence and an appearing frequency of each of first strings each having a fixed length appearing in the base sequence; and a processor for executing a process including: obtaining queries for searching homology in the base sequence; retrieving each of second strings each having a longer fixed length then that of first strings and partially appearing in each of the queries; determining an approximate appearing frequency of each of the second string on the basis of the appearing frequency of the first strings; evaluating for each of the query sequences a load of task for searching homology; and allocating each task for searching homology for each of the queries among the devices on the basis of the result of evaluation of the load of the each task.

10 Claims, 10 Drawing Sheets

FIG. 2

|  | DATABASE X | DATABASE Y |
|---|---|---|
| QUERY A (SEQUENCE A) | 30 sec. | 60 sec. |
| QUERY B (SEQUENCE B) | 60 sec. | 30 sec. |

START
↓
INVESTIGATE APPEARING FREQUENCY OF ALL KINDS OF FIXED-LENGTH CHARACTER STRINGS — S101
↓
SAVE APPEARING FREQUENCY PER KIND OF FIXED-LENGTH CHARACTER STRING — S102
↓
END

| FIXED-LENGTH CHARACTER STRING | APPEARING FREQUENCY |
|---|---|
| aaaaaaaa | 201 |
| aaaaaaac | 434 |
| aaaaaaag | 143 |
| aaaaaaat | 450 |
| ... | ... |
| ttttttta | 402 |
| tttttttc | 311 |
| tttttttg | 224 |
| tttttttt | 246 |

FIG. 11

| LENGTH OF FIXED-LENGTH CHARACTER STRING | 8 | 9 | 10 | 11 | 12 | 13 | 14 | ... |
|---|---|---|---|---|---|---|---|---|
| TABLE SIZE (Byte) | 256K | 1M | 4M | 16M | 64M | 256M | 1G | ... |

SEQUENCE LISTING

<160> NUMBER OF SEQ ID NOS: 7

<210> SEQ ID NO 1
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
cctatggctg tacgt                                                        15

<210> SEQ ID NO 2
<211> LENGTH: 11
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
cctatggctg t                                                            11

<210> SEQ ID NO 3
<211> LENGTH: 11
<212> TYPE: DNA
<213> ORGANISM: Artificial Sequence
<220> FEATURE:
<223> OTHER INFORMATION: Description of Artificial Sequence: Synthetic
      oligonucleotide

```
<400> SEQUENCE: 3
ctatggctgt a                                                          11

<210> SEQ ID NO 4
<211> LENGTH: 11
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
tatggctgta c                                                          11

<210> SEQ ID NO 5
<211> LENGTH: 11
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
atggctgtac g                                                          11

<210> SEQ ID NO 6
<211> LENGTH: 11
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
tggctgtacg t                                                          11

<210> SEQ ID NO 7
<211> LENGTH: 10
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
cctatggctg                                                            10
```

HOMOLOGY SEARCHING METHOD

CROSS-REFERENCE TO RELATED APPLICATION

This application is based upon and claims the benefit of priority of the prior Japanese Patent Application No. 2008-309941, filed on Dec. 4, 2008, the entire contents of which are incorporated herein by reference.

FIELD

The embodiment discussed herein is related to a homology searching method.

BACKGROUND

Homology search is a process of finding out biologically similar sequences (=highly homologous sequences) from within an existing group of sequences, for example, when an unknown DNA base sequence (hereinafter, simply referred to as a "sequence") has been found. Applying it to general retrieval, the unknown sequence corresponds to a query and the existing group of sequences corresponds to a database.

In the homology search, in many cases, a plurality of sequences are input as queries upon execution of single retrieval. The plurality of sequences are not in mutually dependent relation and hence the retrieval can be performed independently on a sequence by sequence basis. Specifically, if N sets of retrieval servers are installed, a query can be N-partitioned in units of sequences and the respective partitioned queries can be separately input into the respective servers. In this case, if the sequence lengths of the queries after partitioned are almost equal to one another, retrieving performance which is higher by a factor of N can be obtained in theory and it is expected to obtain a result of retrieval in a 1/N retrieval time. Therefore, in many cases, the homology search is accelerated by partitioning a query and using a plurality of servers.

For example, FIG. 1 is a diagram illustrating theoretical retrieval times before and after partition in the case that a query has been partitioned into two parts. In the drawing, partitioned queries 1 and 2 are queries obtained by partitioning a not-yet-partitioned query into two parts in units of a sequence. Here, in the case that the retrieval time by the not-yet-partitioned query is T, if the sequence length of the partitioned query 1 is equal to the sequence length of the partitioned query 2, the retrieval times by the partitioned query 1 and the partitioned query 2 will be respectively T/2 in theory and it will be expected to accomplish the retrieving process in a T/2 time as a whole.

Incidentally, in the homology search, there exist many algorithms such as Smith & Waterman, FASTA, BLAST and the like. Although these algorithms have their merits and demerits, the most frequently used algorithm is the BLAST. Because, although the BLAST is lower than other algorithms in retrieval accuracy, it has such an advantage that its retrieval time is shorter than those of other algorithms by one or more figures. Even in the homology search on the basis of the BLAST algorithm (hereinafter, simply referred to as the "BLAST"), accelerating by partitioning a query and using a plurality of servers is general.

Japanese Laid-open Patent Publication No. 09-50438, Japanese Laid-open Patent Publication No. 2005-84973, and International Publication Pamphlet No.WO2002/090978 discloses a related technique.

However, in case of the BLAST, it sometimes occurs that although the sequence lengths are the same as each other, the retrieval time is greatly varied depending on the details of each sequence and it is difficult to predict in advance the retrieval time. According to a result of investigation conducted by the applicants of the present invention, the value of correlation between the length of the query sequence and the retrieval time was limited to as low as about 0.6 to 0.7. In general, it cannot be said that the correlation is high unless the correlation value exceeds 0.9. Therefore, in the case that the query is partitioned on the basis of the sequence length, there is a possibility that a considerable time difference will be generated between respective retrieving processes on the basis of partitioned queries.

FIG. 2 is a diagram illustrating examples of retrieval times in the case that two sequences having the same sequence length have been used as queries. In the drawing, it is assumed that although a sequence A is different from a sequence B in details, they are equal to each other in sequence length.

In the case that these sequences have been used as queries and retrieval has been performed for a sequence database X, it is not rare that the sequences A and B are different from each other in retrieval time by a factor of two or more times (independency of retrieval time of sequence length). In addition, it may occur that in the case that the retrieval is performed for the sequence database X, the sequence A is shorter in retrieval time, while in the case that the retrieval is performed for another sequence database (a sequence database Y), the sequence B is shorter in retrieval time (sequence-database-dependent inversion of retrieval time). As described above, since the retrieval time is greatly varied depending on a combination of a query sequence with a sequence database, it is difficult to highly accurately predict the retrieval time from the features of the query sequence by the BLAST.

However, since there is no appropriate method from a practical viewpoint, when a query is to be partitioned, in many cases, the query is partitioned such that the sequence lengths of the partitioned queries are equal to one another. As a result, such a problem occurs that when the number of retrieval servers is increased, high paralleling effect cannot be obtained.

For example, FIG. 3 is a diagram illustrating retrieval times by the BLAST before and after partition in the case that a query has been partitioned into two parts on the basis of the sequence length. In the drawing, a retrieval time t2 of a partitioned query 2 is shorter than T/2. However, a retrieval time t1 of a partitioned query 1 is longer than T/2. As a result, the sum of the retrieval times is t1 which is longer than T/2.

Incidentally, there is also available a method of partitioning a query using the number of HSPs (High Scoring Pair) instead of the sequence length. By the BLAST, a part where a query sequence perfectly matches with each sequence in a sequence database in units of a specified character string length (HSP length) is found and the retrieval is performed using it as a base. This perfectly matched part is called the HSP and the number of the HSPs in a sequence database is called the HSP number.

The correlation between the HSP number and the retrieval time is as very high as about 0.95 and if query partition is performed on the basis of the HSP number (such that the HSP numbers are equal to each other, a variation in execution time between queries which have been partitioned can be reduced. However, in order to acquire the HSP number, it is necessary to collate each specified-character-string-length-based character string taken out of the query sequence with each sequence in the sequence database. Therefore, such a problem occurs that a process of acquiring the HSP number becomes overhead (tens % of the homology search time in some cases).

FIG. 4 is a diagram illustrating processing time by the BLAST before and after partition in the case that a query has been partitioned into two parts on the basis of the HSP number. In this case, the retrieval time of the partitioned query 1 and the retrieval time of the partitioned query 2 are respectively nearly T/2. However, since a partitioning process takes much time, the total processing time exceeds T/2.

SUMMARY

According to an aspect of the invention, an apparatus, for controlling a plurality of devices for searching homology of a plurality of query character sequences in a base character sequence in parallel, includes: a memory for storing a base character sequence and an appearing frequency of each of first types of character strings each having a fixed length appearing in the base sequence; and a processor for executing a process including: obtaining a plurality of query character sequences for searching homology in the base character sequence, retrieving each of second types of character strings each having a longer fixed length then that of first types of the character strings and partially appearing in each of the query character sequences, determining an approximate appearing frequency of each of the second types of the character string on the basis of the appearing frequency of the first types of the character strings, evaluating for each of the query character sequences a load of task for searching homology, and allocating each task for searching homology for each of the query character sequences among the devices on the basis of the result of evaluation of the load of the each task.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating examples of retrieval times in the case that two sequences having the same sequence length have been used as queries.

FIG. 10 discloses SEQ ID NOS 1-6, respectively, in order of appearance.

FIG. 11 is a diagram illustrating relation between the length of the fixed-length character string and the size of the fixed-length character string appearing frequency table.

DESCRIPTION OF EMBODIMENT

Figure 1:
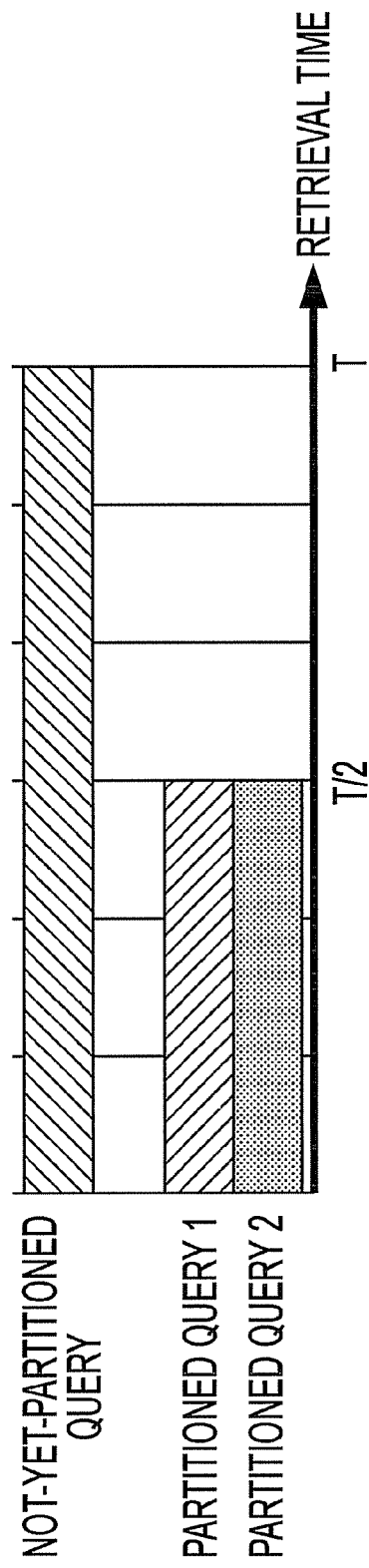
FIG. 1 is a diagram illustrating theoretical retrieval times before and after partition in the case that a query has been partitioned into two parts.
Figure 3:
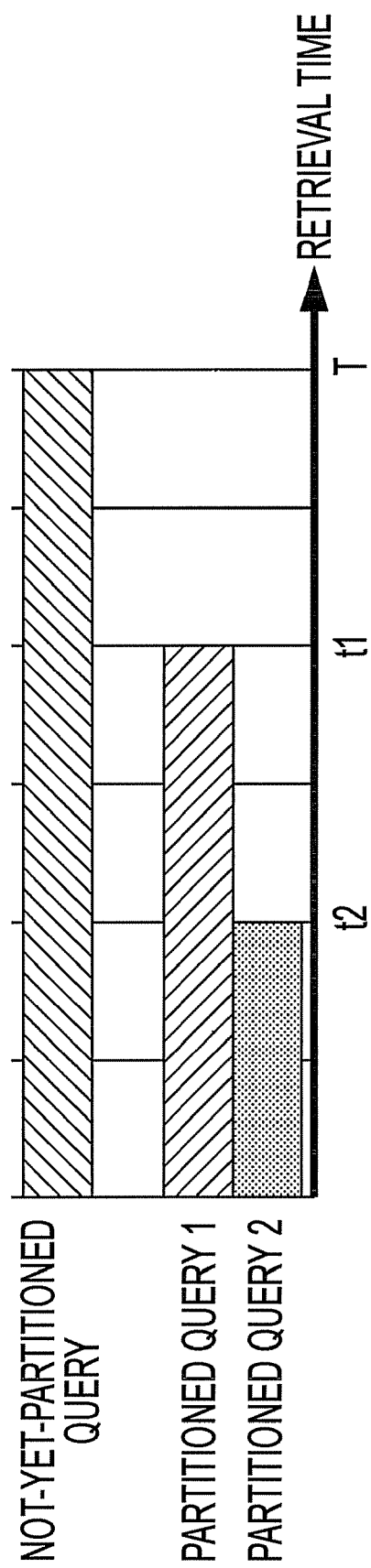
FIG. 3 is a diagram illustrating retrieval times by the BLAST before and after partition in the case that a query has been partitioned into two parts on the basis of the sequence length.
Figure 4:
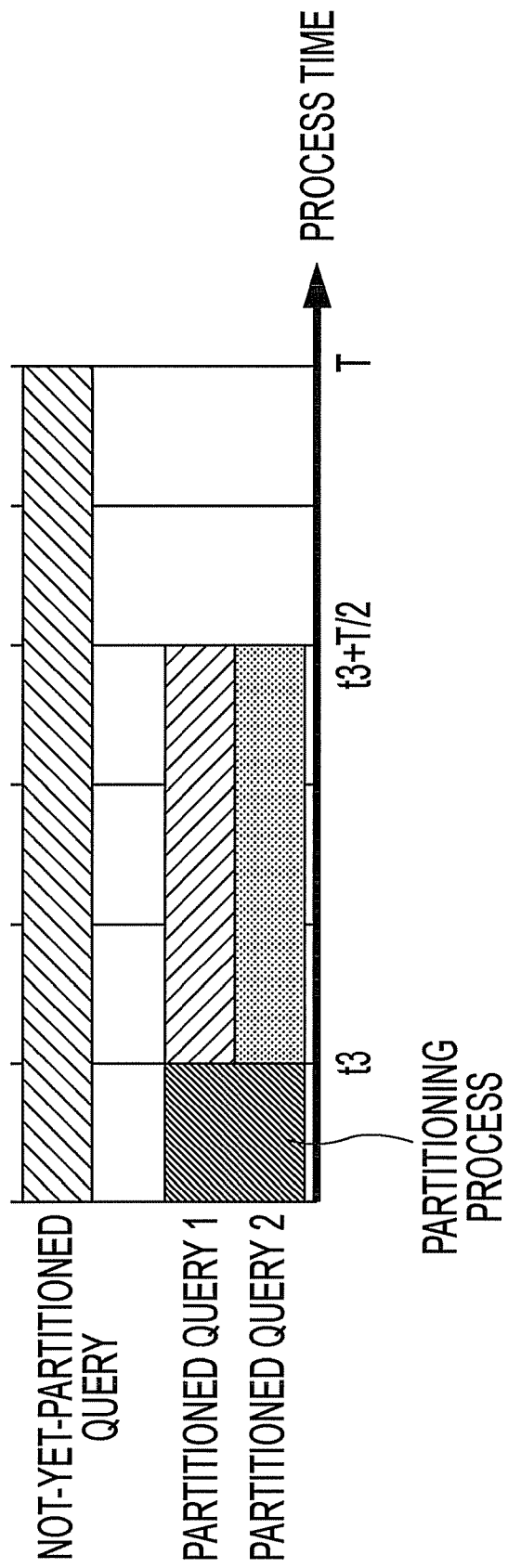
FIG. 4 is a diagram illustrating processing time by the BLAST before and after partition in the case that a query has been partitioned into two parts on the basis of the HSP number.
Figure 5:
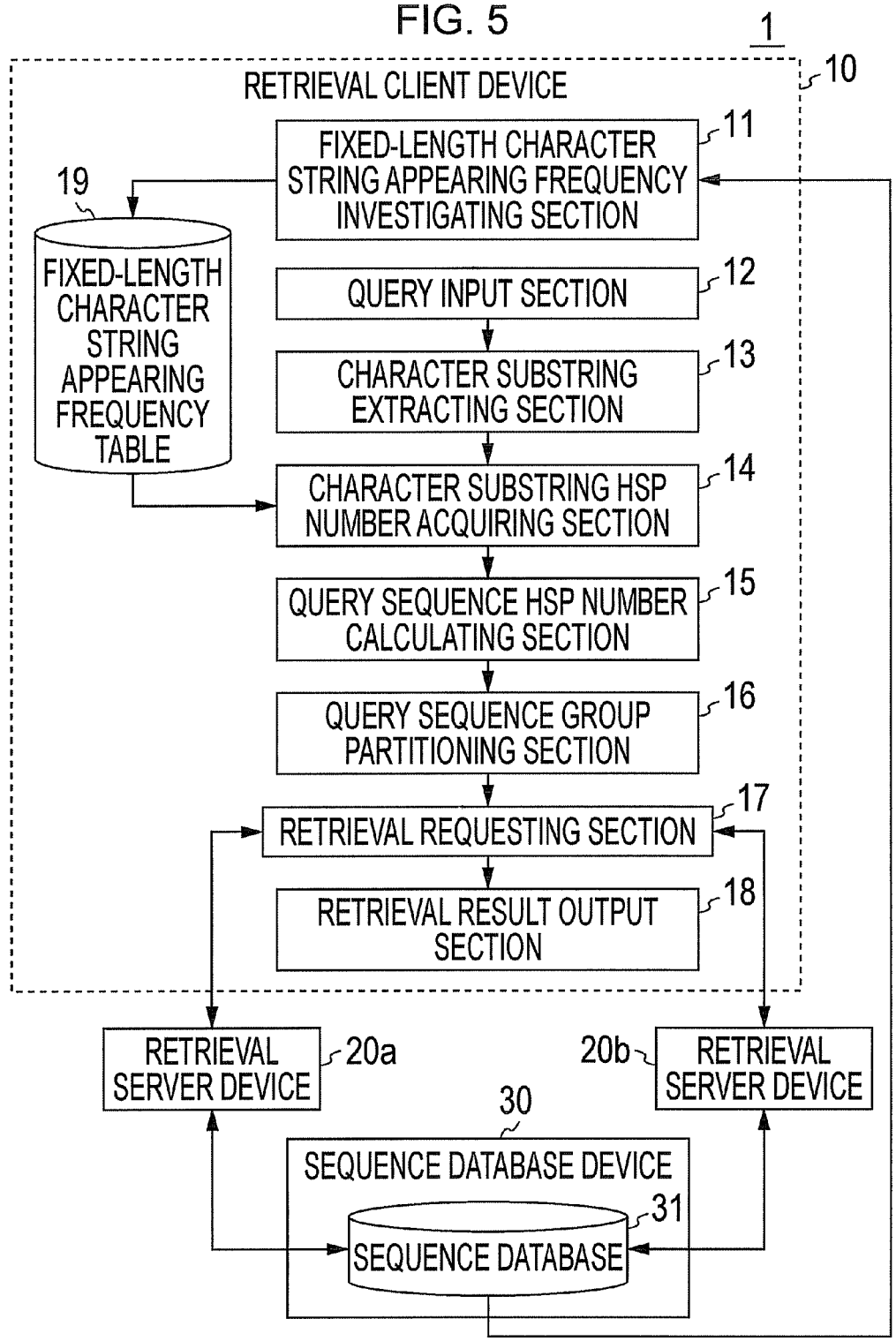
FIG. 5 is a diagram illustrating a structural example of a homology searching system according to this embodiment.

An embodiment of the invention will be described on the basis of the accompanying drawings. FIG. 5 is a diagram illustrating a structural example of a homology searching system according to this embodiment. In the drawing, the homology searching system 1 includes a retrieval client device 10, retrieval server devices 20a and 20b, a sequence database device 30 and the like. Respective devices are connected together via a network such as LAN (Local Area Network), Internet or the like.

The sequence database device 30 is a device having a storage device in which a sequence database 31 is stored. The sequence database 31 is a base sequence database including a set of well known or existing DNA base sequences (a sequence of a c g t, hereinafter, simply referred to as the "sequence"). The base sequences may be call "the base character sequences".

The retrieval serve devices 20a and 20b (hereinafter, generally referred to as the "retrieval server devices 20") are computers that perform homology search on the sequence database 31 on the basis of a query sequence input from the retrieval client device 10 and respond a result of retrieval to the retrieval client 20. In this embodiment, the retrieval server devices 20 perform the homology search using the BLAST (Basic Local Alignment Search Tool).

The retrieval client device 10 is a computer that properly partitions a group of input query sequences (query character sequences) into N parts in units of a query sequence and inputs the partitioned query sequence into each of the retrieval server devices 20. Incidentally, the number of partitions of the query sequence group depends on the number of the retrieval server devices 20 (the number of processors). In the case that the number of the retrieval server devices 20 is N, it is N-partitioned. Thus, in this embodiment, it is partitioned into 2 parts.

In the drawing, the retrieval client device 10 has a fixed-length character string appearing frequency inspecting section 11, a query input section 12, a character substring extracting section 13, a character substring HSP number acquiring section 14, a query sequence HSP number calculating section 15, a query sequence group partitioning section 16, a retrieval requesting section 17, a retrieval result output section 18, a fixed-length character string appearing frequency table 19 and the like. These sections are implemented using programs installed in the retrieval client device 10. Incidentally, these sections need not necessarily be disposed in the same computer. Cooperation by respective sections may be performed via a network.

The fixed-length character string appearing frequency inspecting section 11 inspects the appearing frequency of sequences included in the sequence database 31 with respect to all kinds of sequences having predetermined fixed-lengths. The fixed-length character string appearing frequency inspecting section 11 records a result of inspection in a storage device as the fixed-length character string appearing frequency table 19. The query input section 12 accepts input of a query sequence group (for example, an unknown base sequence group). The input may be either performed via a network or performed using an input device (a keyboard, a mouse or the like) connected to the retrieval client device 10. The character substring extracting section 13 extracts all character substrings having specified character string lengths (HSP (High Scoring Pair) lengths) from each query sequence. The character substring is a continuous partial character string in a query sequence. The HSP length is specified as a parameter upon retrieval.

The character substring HSP number acquiring section 14 acquires an actually measured value or an estimated value of the HSP number (the appearing frequency in the sequence database 31) of each character substring using the fixed-length character string appearing frequency table 18. The query sequence HSP number calculating section 15 calculates an actually measured value or an estimated value of the HSP number of each query sequence on the basis of the actually measured value or the estimated value of the HSP number of each character substring. The query array group partitioning section 16 partitions a query sequence group into N parts (in this embodiment, two parts) on the basis of the actually measured value or the estimated value of the HSP number of each query sequence. The retrieval requesting section 17 inputs the partitioned query sequence into each of the retrieval server devices 20 to make the respective retrieval server devices 20 execute the homology search in parallel with each other and receives a result of retrieval from each of the retrieval server devices 20. The retrieval result output section 18 outputs the result of retrieval. An output destination may be either a computer via a network or a display device connected to the retrieval client device 10.

Figure 6:
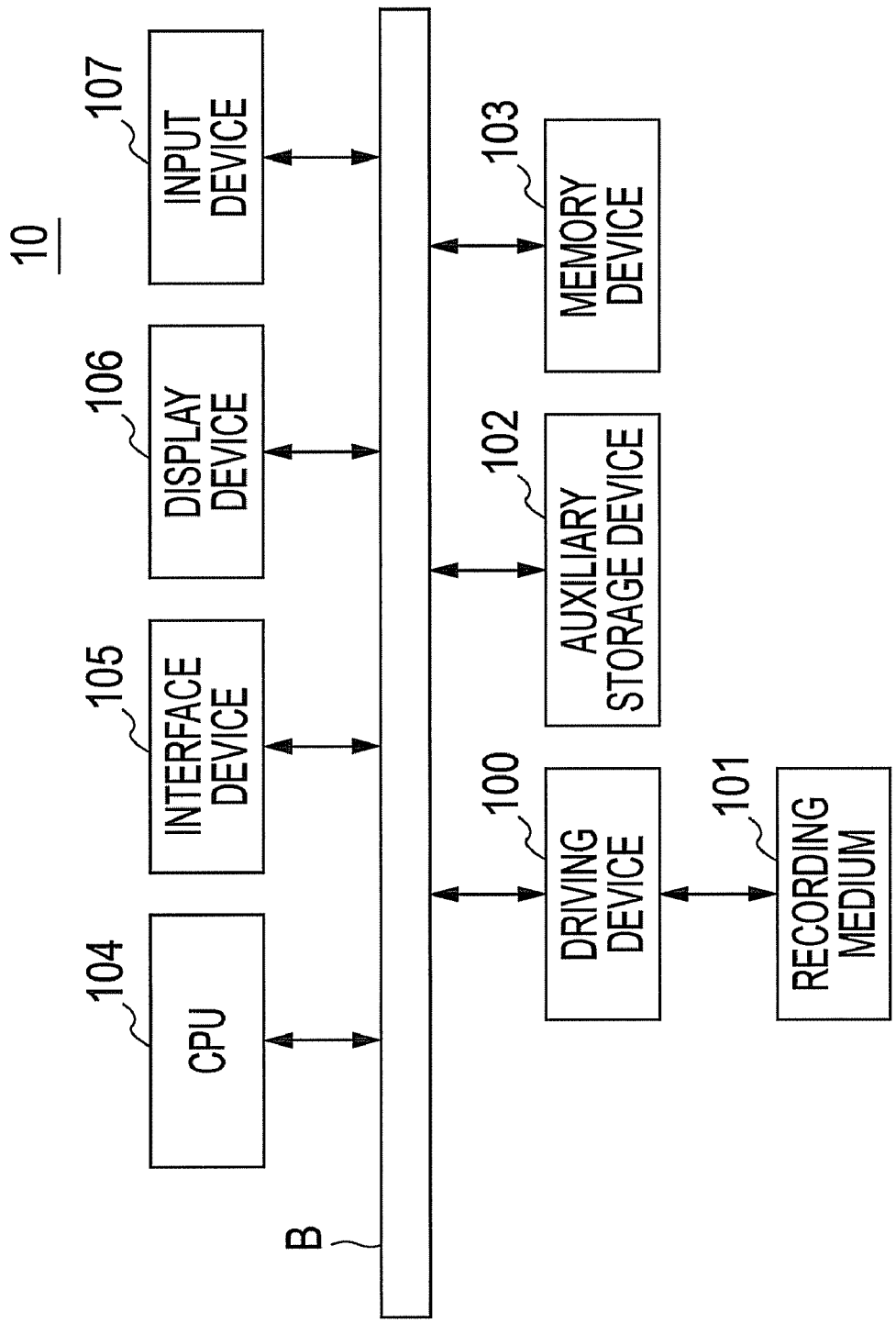
FIG. 6 is a diagram illustrating a hardware structural example of the retrieval client device according to this embodiment.

FIG. 6 is a diagram illustrating a hardware structural example of the retrieval client device (apparatus) according to this embodiment. The retrieval client device 10 illustrated in FIG. 6 has a driving device 100, an auxiliary storage device 102, a memory device 103, a CPU (processor) 104, an interface device 105, a display device 106 and an input device 107 which are mutually connected via a bus B.

A program implementing processing in the retrieval client device 10 is furnished from a recording medium 101 such as a CD-ROM or the like. When the recording medium 101 in which the program is recorded is set on the driving device 100, the program is installed from the recording medium 101 into the auxiliary storage device 102 via the driving device 100. Incidentally, the program need not necessarily be installed from the recording medium 101 and may be downloaded from another computer via a network. The auxiliary storage device 102 stores therein the installed program and stores therein necessary files, data and the like (for example, the fixed-length character string appearing frequency table 19). The fixed-length character string may be called "a first types of character strings."

In the case that start of the program has been instructed, the memory device 103 reads out the program from the auxiliary storage device 102 to be stored therein. The auxiliary storage device 102 and the memory device 103 collectively may be called a memory. The memory stores a base character sequence and an appearing frequency of each of first types of character strings each having a fixed length appearing in the base sequence.

The CPU 104 implements a function relating to the retrieval client device 10 in accordance with the program stored in the memory device 103. The CPU 104 executes a process including: obtaining a plurality of query sequences (query character sequences) for searching homology in the base sequence, retrieving each of second types of character strings each having a longer fixed length then that of first types of the character strings and partially appearing in each of the query sequences, determining an approximate appearing frequency of each of the second types of the character string on the basis of the appearing frequency of the first types of the character strings, evaluating for each of the query character sequences a load of task for searching homology, and allocating each task for searching homology for each of the query character sequences among the devices on the basis of the result of evaluation of the load of the each task.

The interface device 105 is used as an interface to be connected to a network. The display device 106 displays a GUI (Graphical User Interface) or the like by the program. The input device 107 is constituted by a keyboard, a mouse and the like and is used to input various operating instructions.

Next, processing procedures of the retrieval client device 10 will be described. First, a preparing process to be executed in advance before execution of the homology search will be described.

Figures 7, 8:
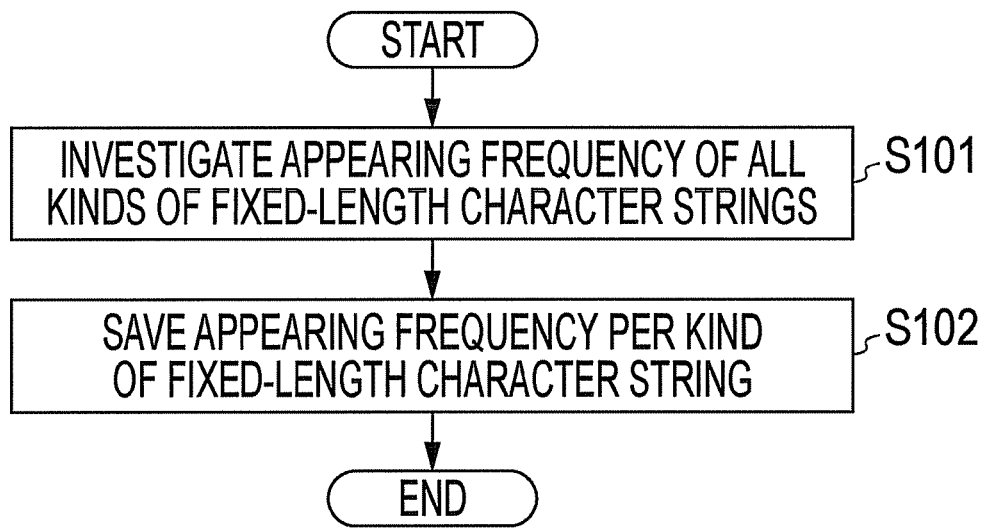
FIG. 7 is a flowchart illustrating processing procedures of the pre-preparing process.
FIG. 8 is a diagram illustrating an example of the fixed-length character string appearing frequency table.

FIG. 7 is a flowchart illustrating processing procedures of the pre-preparing process.

At step S101, the fixed-length character string appearing frequency inspecting section 11 retrieves parts matching with all the sequences included in the sequence database 31 with respect to all kinds of sequences having fixed lengths (fixed-length character strings) to acquire the appearing frequency of the fixed-length character strings in the sequence database 31.

Next, the fixed-length character string appearing frequency inspecting section 11 saves information indicative of the kind-based appearing frequency of the fixed-length character strings as the fixed-length character string appearing frequency table 19 in the auxiliary storage device 102 (S102).

FIG. 8 is a diagram illustrating an example of the fixed-length character string appearing frequency table. In the drawing, there is illustrated an example in which the length of the fixed-length character string is defined as 8. In case of the base sequence, each of elements of the sequence will be any one of four characters (a c g t). Thus, in the case that the character string length (the sequence length) is 8, there exist 4 raised to 8th power=65536 kinds of fixed-length character strings. The appearing frequencies are recorded in the fixed-length character string appearing frequency table 19 in units of all kinds of fixed-length character strings.

Incidentally, in the case that there exist a plurality of sequence databases 31, the process illustrated in FIG. 7 is executed on each of the sequence databases 31. In addition, the process is executed every time the content of each sequence database 31 is updated.

The following processing procedures are executed on the assumption that the fixed-length character string appearing frequency table 19 as described above has been prepared.

Figure 9:
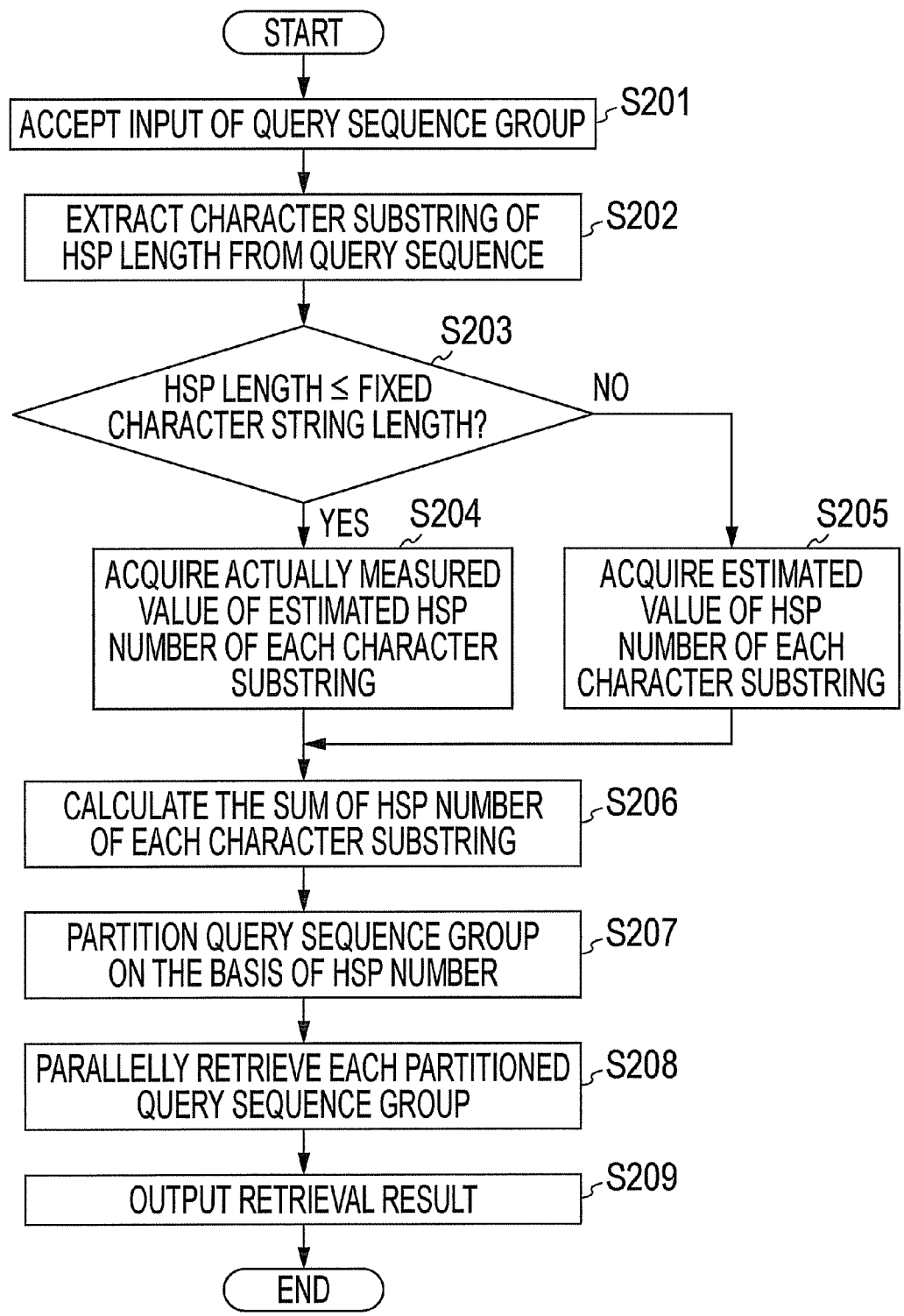
FIG. 9 is a flowchart illustrating the processing procedures executed using the retrieval client device in the homology search.

FIG. 9 is a flowchart illustrating the processing procedures executed using the retrieval client device in the homology search.

At step S201, the query input section 12 accepts input of a query sequence group. The sequence lengths of respective query sequences need not necessarily be the same as one another. Then, the character substring extracting section 13 extracts all the character substrings of the HSP length from each query sequence (S202). The HSP length may be either input following input of the query sequence group or recorded in advance in the auxiliary storage device 102. Incidentally, the HSP length can be varied for each retrieval.

Figure 10:
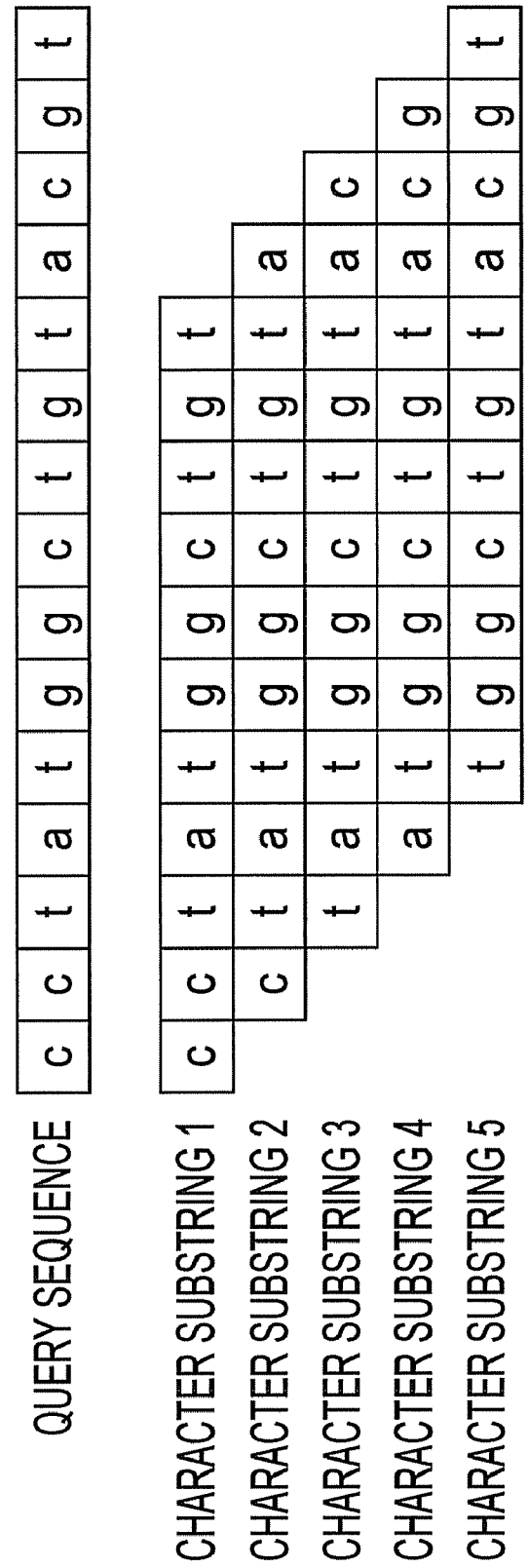
FIG. 10 is a diagram illustrating extraction of character substrings from a query sequence.

FIG. 10 is a diagram illustrating extraction of character substrings from a query sequence. In the drawing, there is illustrated an example in which the character substrings are extracted from the query sequence having the sequence length of 15 in the case that the HSP length has been specified to 11. In this case, five character substrings of the character substrings 1 to 5 are extracted. When generalized, in the case that the query sequence length is N and the HSP length is M, N−M+1 character substrings are extracted. Incidentally, although, in the drawing, there is illustrated an example in which the character substrings are extracted from one query sequence, the same thing is performed on each query sequence.

Next, the character substring HSP number acquiring section 14 acquires an actually measured value or an estimated value of the HSP number of each of the extracted character substrings. Specifically, in the case that the HSP length (the character substring length) is less than the length of the fixed-length character string (Yes at S203), the character substring HSP number acquiring section 14 acquires the actually measured value of the HSP number (the actually measured HSP number) of each character substring using the fixed-length character string appearing frequency table 19 (S204). That is, when the HSP length is the same as the length of the fixed-length character string, the appearing frequency which is registered for a character string matching with the character substring in the fixed-length character string appearing frequency table 19 is defined as the actually measured HSP number of the character substring concerned. In addition, when the HSP length is less than the length of the fixed-length character string, the sum of the appearing frequencies which are registered for character strings which firstly include character strings matching with the character substring (the character strings whose front parts match with the character substring) in the fixed-length character string appearing frequency table 19 is defined as the actually measured HSP number of the character substring concerned. The reason why the HSP number which is acquired here is called the "actually measured value" lies in that each character substring coincides with the actually appearing frequency of the fixed length character string in the sequence database 31.

On the other hand, in the case that the HSP length is larger than the length of the fixed-length character string (No at S203), any accurate HSP number cannot be acquired on the bases of the fixed-length character string appearing frequency table 19. Thus, the character substring HSP number acquiring section 14 estimates the HSP number of character substrings $[1 i 1 i+_1 \ldots 1 M-_1 1 M]$ on the basis of the fixed-length character string appearing frequency table 19 and the following HSP number estimation expression (1) (that is, acquires (calculates) the estimated value of the HSP number (the estimated HSP length) of each character substring) (S204).

$$\frac{\prod_{i=1}^{M-(N-1)} cntN[l_i l_{i+1} l_{i+2} \ldots l_{i+(N-1)}]}{\prod_{i=2}^{M-(N-1)} cnt(N-1)[l_i l_{i+1} l_{i+2} \ldots l_{i+(N-2)}]} \quad (1)$$

Meanings of respective parameters or functions in the expression (1) are as follows: M: HSP length; 1i: the i-th character in a character substring (the starting point of i is 0); N: the length of a fixed-length character string; cnt X [Y]: the appearing frequency of a character string X having a character string length Y; Incidentally, the head symbols of the numerator and the denominator indicate gross powers.

The grounds for the expression (1) will be described later. Here, in order to understand the way of using the expression (1), specific values will be applied to the expression (1). For example, when the length (N) of the fixed-length character string is 8 as illustrated in FIG. 8 and the HSP length (M) is 11 as illustrated in FIG. 10, the expression (1) turns to the following expression (2).

$$\frac{\prod_{i=1}^{11-7} cnt8[l_i l_{i+1} l_{i+2} l_{i+3} l_{i+4} l_{i+5} l_{i+6} l_{i+7}]}{\prod_{i=2}^{11-7} cnt7[l_i l_{i+1} l_{i+2} l_{i+3} l_{i+4} l_{i+5} l_{i+6}]} \quad (2)$$

For example, expansion of the expression (2) using the character substring 1 in FIG. 10 as an object results in as follows.

$$cnt8[cctatggc] \times (cnt8[ctatggct]/cnt7[ctatggc]) \times \\ (cnt8[tatggctg]/cnt7[tatggct]) \times \\ (cnt8[atggctgt]/cnt7[atggctg]) \quad \text{Expression (3)}$$

Each term in the expression which has been expanded here is the appearing frequency of an 8-character string or a 7-character string. Therefore, the value of each term can be acquired from the fixed-length character string appearing frequency table 19. That is, the estimated HSP length of the character substring can be obtained on the basis of the fixed-length character string appearing frequency table 19 in accordance with the expression (1).

The character substring HSP number acquiring section 14 executes the above mentioned processing on each character substring to acquire the estimated HSP length of each character substring.

Then, the query sequence HSP number calculating section 15 calculates the sum of the actually measured HSP numbers or the estimated HSP numbers of the character substrings per query sequence to acquire the actually measured HSP number or the estimated HSP number of each query sequence (hereinafter, simply referred to as the "HSP number") (S206). Then the query sequence group partitioning section 16 partitions the query sequence group into two parts on the basis of the HSP number of each query sequence (S207). In this occasion, the query sequence group partitioning section 16 partitions it such that a difference in sum of the HSP numbers between two query sequence groups after partitioned is minimized.

Then, the retrieval requesting section 17 inputs one of the two partitioned query sequence groups into the retrieval sever device 20a and the other into the retrieval server device 20b to make the respective retrieval server devices 20 execute the homology search on the sequence database 31 in parallel with each other (S208). When a result of retrieval is returned from each of the retrieval server devices 20, the retrieval result output section 18 makes for example the display device 106 display the retrieval result (S209).

As described above, according to the retrieval client device 10 of this embodiment, the actually measured value or the estimated value of the HSP number of each query sequence can be acquired at a high speed on the basis of the fixed-length character string appearing frequency table 19. Therefore, the overhead relating to the process of partitioning the query sequence group on the basis of the HSP number can be remarkably reduced. As a result, the high paralleling effect can be obtained as for the entire retrieving process. In addition, the retrieval time can be predicted at a high speed and with high accuracy.

Incidentally, the above mentioned effect is based on the assumption that the accuracy of the HSP number acquired using the character substring HSP number acquiring section 14 is high. Because if the accuracy of the HSP number concerned is low, the query sequence group cannot be effectively partitioned from the viewpoint of retrieval performance.

Thus, the accuracy of the HSP number concerned will be considered. In this embodiment, the actually measured value or the estimated value can be obtained for the HSP number. With respect to the actually measured value, no problem occurs in its accuracy. Therefore, it will be considered to be sufficient if the actually measured value is usually obtained. The actually measured value is obtained in the case that the HSP length is less than the length of the fixed-length character string. If so, the length of the fixed-length character string will have only to be set longer than the HSP length to be specified.

However, the HSP length can be optionally specified upon retrieval and hence it is not practical to prepare the fixed-length character string appearing frequency table 19 for the maximum HSP length which can be expected to be specified.

For example, FIG. 11 is a diagram illustrating relation between the length of the fixed-length character string and the size of the fixed-length character string appearing frequency table. In the drawing, it is assumed that 4 bytes are used for one entry of the fixed-length character string appearing frequency table 19. If the length of the fixed-length character string is defined as 8 characters as in this embodiment, the table size will be 256 K Bytes. After that, every time the length of the fixed-length character string is increased by one character, the table size is quadrupled. As a result, for 14 characters, it is increased to 1 G Byte and hence there is a possibility that a memory capacity larger than the sequence database 31 will be necessary. In addition, an increase in table size leads to an increase in reference time for the fixed-length character string appearing frequency table 19.

Therefore, in this embodiment, the length of the fixed-length character string is defined as 8. In this case, the size of the fixed-length character string appearing frequency table 19 is 256 K Bytes and the possibility that all of them can be expanded on the memory device 103 is high. As a result, the reference time for the fixed-length character string appearing frequency table 19 can be reduced.

However, the HSP number that can be obtained in this case is of an estimated value. Thus, the accuracy of the estimated HSP number in this embodiment, that is, the grounds for the expression (2) will be described.

Here, the character substring 1 (c c t a t g g c t g t (SEQ ID NO: 2)) illustrated in FIG. 10 is assumed to be an estimated object of the HSP number. According to the expression rule in this embodiment, the HSP number of the character substring 1 is expressed as cnt 11 [cctatggctgt (SEQ ID NO: 2)].

It is expanded as follows.

cnt 11[cctatggctgt (SEQ ID NO: 2)]=cnt 10 [cctatggctg (SEQ ID NO: 7)]×(cnt 11[cctatggctgt (SEQ ID NO: 2)]/cnt 10 [cctatggctg (SEQ ID NO: 7)]) (First Expansion Expression)

This is not more than the one in which cnt 11 [cctatggctgt (SEQ ID NO: 2)] is divided by cnt 10 [cctatggctg (SEQ ID NO: 7)] and then a result of division and cnt 10 [cctatggctg (SEQ ID NO: 7)] are multiplied.

Here, the inventors of the present application have found out that the first expansion expression can be approximated to a first approximate expression as follows.

cnt 10[cctatggctg (SEQ ID NO: 7)]×(cnt 11[cctatggctgt (SEQ ID NO: 2)]/cnt 10[cctatggctg (SEQ ID NO: 7)])≈cnt 10[cctatggctg (SEQ ID NO: 7)]×(cnt 8[atggctgt]/cnt 7[atggctg]) (First Approximate Expression)

Approximation from the first expansion expression to the first approximate expression will be described. First, attention will be paid to a partial expression cnt 11[cctatggctgt (SEQ ID NO: 2)]/cnt 10[cctatggctg (SEQ ID NO: 7)] in the first expansion expression. This means to divide the appearing frequency of the 11-character string [cctatggctgt (SEQ ID NO: 2)] by the appearing frequency of the 10-character string [cctatggctg (SEQ ID NO: 7)]. The 10-character string concerned is in the form that the end t of the 11-character string concerned is deleted. Thus, the partial expression concerned corresponds to the probability that "t" appears after the 10-character string concerned.

That is, the expansion from the first expansion expression to the first approximate expression is based on an estimation that the probability that "t" appears after the 10-character string [cctatggctg (SEQ ID NO: 7)] is approximate to the probability that "t" appears after the 7-character string [atggctg]. Here, the 7-character string concerned [atggctg] is in the form that the first "c c t" of the 10-character string concerned [cctatggctg (SEQ ID NO: 7)] are deleted and the subsequent 7 characters in the both strings perfectly coincide with one another. Therefore, the certainty of the estimation concerned is thought to be very high also in theory.

In addition, the inventors of the present application have inspected the appearing frequencies of the above 11-character string, 10-character string, 8-character string and 7-character string by using the actual sequence database in order to prove the estimation concerned and have confirmed that an error in the above approximation is little enough to be negligible in practical use.

Thus, cnt 10 [cctatggctg (SEQ ID NO: 7)] in the first approximate expression can be expanded as follows.

$$cnt10[cctatggctg \text{ (SEQ ID NO: 7)}] = \quad \text{(Second Expansion Expression)}$$
$$cnt9[cctatggct] \times$$
$$(cnt10[cctatggctg \text{ (SEQ ID NO: 7)}]/cnt9[cctatggct])$$

$$\approx cnt9[cctatggct] \times \quad \text{(Second Approximate Expression)}$$
$$(cnt8[tatggctg]/cnt7[tatggct])$$

Expansion to the second expansion expression is obvious. In addition, the grounds for expansion from the second expansion expression to the second approximate expression are the same as those for approximation from the first expansion expression to the first approximate expression.

Further, cnt 9 [cctatggct] in the second approximate expression can be expanded as follows.

$$cnt9[cctatggct] = cnt8[cctatggc] \times \quad \text{(Third Expansion Expression)}$$
$$(cnt9[cctatggct]/cnt8[cctatggc])$$

$$\approx cnt8[cctatggc] \times \quad \text{(Third Approximate Expression)}$$
$$(cnt8[ctatggct]/cnt7[ctatggc])$$

Expansion to the third expansion expression is obvious. In addition, the grounds for approximation from the third expansion expression to the third approximate expression are the same as those for expansion from the first expansion expression to the first approximate expression.

Here, if the third approximate expression is substituted into cnt 9 [cctatggct] in the second approximate expression and then an expression obtained from a result thereof is substituted into cnt 10[cctatggctg (SEQ ID NO: 7)] in the first approximate expression, the following expression (4) will be obtained.

$$Cnt8[cctatggc] \times (cnt8[ctatggct]/cnt7[ctatggc]) \times \\ (cnt8[tatggctg]/cnt7[tatggct]) \times (cnt8[atggctgt]/cnt7[atggctg]) \quad (4)$$

The expression (4) is the same as the expression (3) in which the expression (2) has been expanded using the character substring 1 illustrated in FIG. 10 as an object. Thus, this means that the grounds (the validity) for the expression (2) have been verified with respect to the character substring 1. Then, if the expression (2) is valid for the character substring 1, the expression (2) will be thought to be valid for other character strings 2 to 5 in probability. Therefore, it can be said that the estimation using the expression (2) is valid.

Further, also in the case that the HSP length is other than 11 and the length of the fixed-length character string is other than 8, it is thought that the same estimation is possible. For example, even if the HSP length is 12 and the length of the fixed-length character string is 9, the accuracy of estimation will be thought to be high. Thus, it can be said that the estimation on the basis of the expression (1) obtained by generalizing the expression (2) with respect to the HSP length and the length of the fixed-length character string is also valid. Incidentally, from the viewpoint of accuracy of estimation, the smaller the difference between the HSP length and the length of the fixed-length character string, the better.

As described above, according to the retrieval client device 10 of this embodiment, the HSP length can be estimated at a high speed and with high accuracy by applying the appearing frequency which has been registered in advance in the fixed-length character string appearing frequency table 19 into the expression (1). Therefore, the necessity to manage the appearing frequency of the fixed-length character strings by the maximum HSP length in the fixed-length character string appearing frequency table 19 can be remarkably reduced. As a result, the size of the fixed-length character string appearing frequency table 19 can be reduced and the reference time for the table concerned can be reduced. Thus, implementation of partition of the query sequence group on the basis of the HSP number can be made realistic.

Although the embodiment of the present invention has been described in detail as mentioned above, the present invention is not limited to the specific embodiment as mentioned above and can be modified and altered in a variety of ways within the scope of the gist of the present invention defined in the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. An apparatus for controlling a plurality of devices for searching homology of a plurality of query character sequences in a base character sequence in parallel, the apparatus comprising:

a memory for storing a base character sequence and an appearing frequency of each of first types of character strings each having a fixed length appearing in the base character sequence; and a processor for executing a process including:
obtaining a plurality of query character sequences for searching homology in the base character sequence;

retrieving each of second types of character strings each having a longer fixed length then that of first types of the character strings and partially appearing in each of the query character sequences;

determining an approximate appearing frequency of each of the second types of the character string on the basis of the appearing frequency of the first types of the character strings;

evaluating for each of the query character sequences a load of task for searching homology; and allocating each task for searching homology for each of the query character sequences among the devices on the basis of the result of evaluation of the load of the each task.

2. The apparatus according to claim 1, wherein the approximate appearing frequency determining process determines the approximate appearing frequency by using a following equation (1):

$$\frac{\prod_{i=1}^{M-(N-1)} cntN[l_i l_{i+1} l_{i+2} \ldots l_{i+(N-1)}]}{\prod_{i=2}^{M-(N-1)} cnt(N-1)[l_i l_{i+1} l_{i+2} \ldots l_{i+(N-2)}]} \quad (1)$$

3. The apparatus according to claim 1, wherein the length of the second character string is specified by a HSP length.

4. The apparatus according to claim 1, wherein the allocating allocates the each tasks to the devices such that a difference of sum of appearing frequency of each of the second types among the devices is minimized.

5. A method for controlling an apparatus for controlling a plurality of devices for searching homology of a plurality of query character sequences in a base character sequence in parallel, the apparatus including a memory for storing a base character sequence and an appearing frequency of each of first types of character strings each having a fixed length appearing in the base character sequence and a processor for executing a process, the method comprising:

obtaining a plurality of query character sequences for searching homology in the base character sequence by the processor;

retrieving each of second types of character strings each having a longer fixed length then that of first types of the character strings stored in the memory and partially appearing in each of the query character sequences by the processor;

determining an approximate appearing frequency of each of the second types of the character string on the basis of the appearing frequency of the first types of the character strings by the processor;

evaluating for each of the query character sequences a load of task for searching homology by the processor; and allocating each task for searching homology for each of the query character sequences among the devices on the basis of the result of evaluation of the load of the each task by the processor.

6. The method according to claim 5, wherein the approximate appearing frequency determining determines the approximate appearing frequency by using a following equation (1):

$$\frac{\prod_{i=1}^{M-(N-1)} cntN[l_i l_{i+1} l_{i+2} \ldots l_{i+(N-1)}]}{\prod_{i=2}^{M-(N-1)} cnt(N-1)[l_i l_{i+1} l_{i+2} \ldots l_{i+(N-2)}]} \quad (1)$$

7. The method according to claim 5, wherein the allocating allocates the each tasks to the devices such that a difference of sum of appearing frequency of each of the second types among the devices is minimized.

8. A computer readable medium storing a program for controlling an apparatus for controlling a plurality of devices for searching homology of a plurality of query character sequences in a base character sequence in parallel, the apparatus including a memory for storing a base character sequence and an appearing frequency of each of first types of character strings each having a fixed length appearing in the base character sequence and a processor for executing a process, the process comprising:

obtaining a plurality of query character sequences for searching homology in the base character sequence by the processor;

retrieving each of second types of character strings each having a longer fixed length then that of first types of the character strings stored in the memory and partially appearing in each of the query character sequences by the processor;

determining an approximate appearing frequency of each of the second types of the character string on the basis of the appearing frequency of the first types of the character strings by the processor;

evaluating for each of the query character sequences a load of task for searching homology by the processor; and allocating each task for searching homology for each of the query character sequences among the devices on the basis of the result of evaluation of the load of the each task by the processor.

9. The computer readable medium according to claim 8, wherein the approximate appearing frequency determining determines the approximate appearing frequency by using a following equation (1):

$$\frac{\prod_{i=1}^{M-(N-1)} cntN[l_i l_{i+1} l_{i+2} \ldots l_{i+(N-1)}]}{\prod_{i=2}^{M-(N-1)} cnt(N-1)[l_i l_{i+1} l_{i+2} \ldots l_{i+(N-2)}]} \quad (1)$$

10. The computer readable medium according to claim 8, wherein the allocating allocates the each tasks to the devices such that a difference of sum of appearing frequency of each of the second types among the devices is minimized.

* * * * *